(12) United States Patent
Fujii

(10) Patent No.: US 7,613,819 B2
(45) Date of Patent: Nov. 3, 2009

(54) IMAGE REPRODUCTION APPARATUS, CONTROL METHOD THEREOF, PROGRAM AND STORAGE MEDIUM

(75) Inventor: Akio Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 11/200,030

(22) Filed: Aug. 10, 2005

(65) Prior Publication Data

US 2006/0044163 A1    Mar. 2, 2006

(30) Foreign Application Priority Data

Aug. 24, 2004    (JP)    ............... 2004-244126

(51) Int. Cl.
    *H04N 7/12*     (2006.01)
    *H04N 7/50*     (2006.01)
    *H04N 5/91*     (2006.01)
    *H04N 11/02*    (2006.01)
    *H04B 1/66*     (2006.01)

(52) U.S. Cl. .................. 709/231; 375/240; 345/505; 386/95

(58) Field of Classification Search .......... 709/231; 341/50; 375/240; 345/505; 386/95
    See application file for complete search history.

(56) References Cited

U.S. PATENT DOCUMENTS

| | | | | |
|---|---|---|---|---|
| 6,144,765 A  * | 11/2000 | Tamura et al. ............... 382/197 |
| 6,181,872 B1 * | 1/2001  | Yamane et al. ............... 386/112 |
| 6,212,233 B1 * | 4/2001  | Alexandre et al. ..... 375/240.03 |
| 6,219,381 B1 * | 4/2001  | Sawada et al. .......... 375/240.14 |
| 6,285,825 B1 * | 9/2001  | Miwa et al. .................. 386/98 |
| 6,330,392 B1 * | 12/2001 | Nakatani et al. .............. 386/52 |
| 6,542,549 B1 * | 4/2003  | Tan et al. ................ 375/240.26 |
| 6,546,051 B2 * | 4/2003  | Ramaswamy .......... 375/240.03 |
| 6,657,637 B1 * | 12/2003 | Inagaki et al. ............... 345/629 |
| 7,139,316 B2 * | 11/2006 | Yoshinari ............... 375/240.25 |
| 7,197,072 B1 * | 3/2007  | Hsu et al. .............. 375/240.02 |
| 7,483,488 B1 * | 1/2009  | Hsu et al. .............. 375/240.12 |
| 2001/0012246 A1 * | 8/2001 | Mitsuno ....................... 369/32 |

(Continued)

FOREIGN PATENT DOCUMENTS

| | | |
|---|---|---|
| JP | 11-262000 | 9/1999 |
| JP | 2002-158968 | 5/2002 |

*Primary Examiner*—William C Vaughn, Jr.
*Assistant Examiner*—Muktesh G Gupta
(74) *Attorney, Agent, or Firm*—Fitzpatrick, Cella, Harper & Scinto

(57) ABSTRACT

An object of this invention is to suppress discontinuity of a moving image as much as possible. In order to achieve this object, an image reproduction apparatus includes a buffer which temporarily stores an encoded image data stream, a buffer size setting circuit which sets the storage size of the buffer, a decoding time calculation circuit which calculates a decoding time at which the encoded image data stream is output from the buffer to a decoder, and a control circuit which controls to set the storage size of the buffer to at least twice the maximum value of a storage size required by an encoded data stream reproducible by the image reproduction apparatus, start fetching a second encoded image data stream in the buffer immediately after fetch of a first encoded image data stream in the buffer is ended, and calculate the decoding time of the second image data stream on the basis of a time when fetch of the first image data stream in the buffer is ended.

16 Claims, 7 Drawing Sheets

U.S. PATENT DOCUMENTS

| | | | |
|---|---|---|---|
| 2002/0114388 A1* | 8/2002 | Ueda et al. | 375/240.01 |
| 2002/0126752 A1* | 9/2002 | Kim | 375/240.03 |
| 2003/0031252 A1* | 2/2003 | Miyazawa | 375/240.07 |
| 2003/0053797 A1* | 3/2003 | Oshima et al. | 386/98 |
| 2003/0175012 A1* | 9/2003 | Okada et al. | 386/69 |
| 2003/0190146 A1* | 10/2003 | Gotoh et al. | 386/70 |
| 2003/0202784 A1* | 10/2003 | Yamauchi et al. | 386/125 |

* cited by examiner

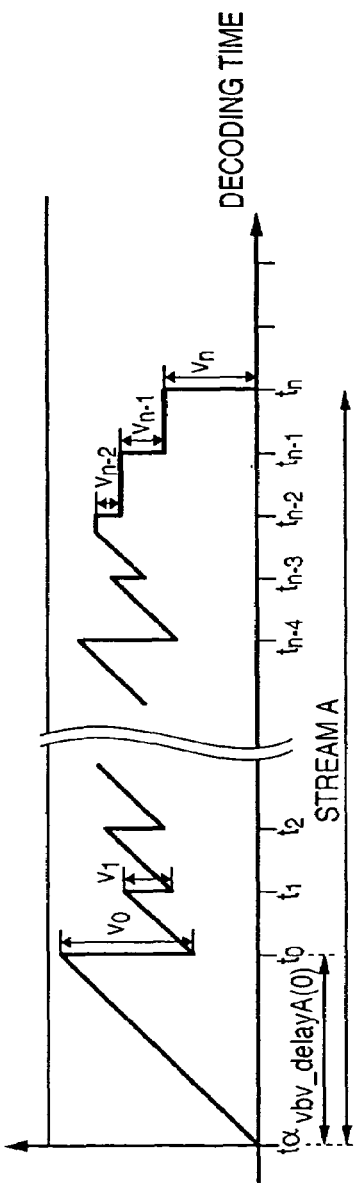
F I G. 5A
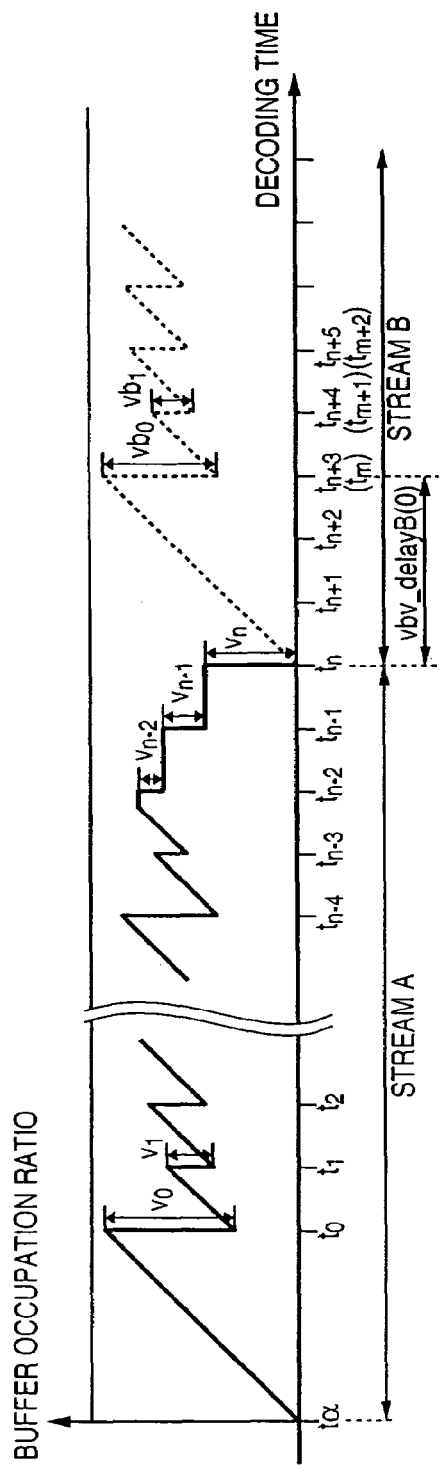
F I G. 5B

IMAGE REPRODUCTION APPARATUS, CONTROL METHOD THEREOF, PROGRAM AND STORAGE MEDIUM

FIELD OF THE INVENTION

The present invention relates to a technique of reproducing an image and, more particularly, to a technique of reproducing moving image data using inter-frame encoding.

BACKGROUND OF THE INVENTION

In recent years, digital video cameras and digital cameras which encode moving image data by using inter-frame encoding such as MPEG and record/reproduce the data are widely used.

In encoding image data by using MPEG, it is done in accordance with a virtual buffer model called vbv_buffer in order to guarantee that encoded image data will be decoded by a decoder without any loss. The decoder decodes image data input from a recording medium or transmission line in accordance with the vbv_buffer model.

An operation of reproducing, from a recording medium, image data encoded by MPEG and decoding it will be described with reference to FIGS. 5A to 5C and 6.

FIG. 6 is a block diagram showing an example of a reproduction apparatus. When a reproduction instruction is input, a control circuit 507 shown in FIG. 6 instructs a reproduction circuit 502 to reproduce, reads out a stream A of MPEG data recorded on a recording medium 501, and writes reproduced data in a buffer 503. As shown in FIG. 5A, the control circuit 507 reads out the stream A from the recording medium 501 at time $t_a$ and writes it in the buffer 503. The control circuit 507 notifies a decoding time calculation circuit 506 of the fetch time $t_a$ in the buffer 503.

At time $t_0$ shown in FIG. 5A, the control circuit 507 reads out first image data $V_0$ from the buffer 503 and sends the data to a decoder (not shown).

On the basis of vbv_delayA(0) detected by a vbv_delay detection circuit 504, the decoding time calculation circuit 506 calculates the time $t_0$ given by $$t_0 = t_a + vbv\_delayA(0) \quad (1)$$

The vbv_delay data is information representing a time during which each picture data of an MPEG stream stays in the buffer memory when the picture data is to be decoded.

The decoding time $t_0$ calculated by the decoding time calculation circuit 506 is supplied to the control circuit 507. At the time $t_0$, the control circuit 507 reads out the reproduced data $V_0$ of the stream A from the buffer 503 and outputs the data from an output terminal 508 to a decoder (not shown).

Decoding time $t_q$ from the time $t_0$ is calculated by the decoding time calculation circuit 506 by $$t_q = t_0 + T_v \times q \ (q=0, 1, 2, \ldots) \quad (2)$$

and supplied to the control circuit 507, where $T_v$ is the reciprocal of the frame frequency (e.g., 29.97 Hz) of the image data.

When the time $t_0$ has come, the control circuit 507 notifies the decoding time calculation circuit 506 of it. The decoding time calculation circuit 506 supplies next decoding time $t_1$ to the control circuit 507.

At the time $t_1$, the control circuit 507 reads out $V_1$ of the stream A of the reproduced data fetched in the buffer 503, outputs the data to the output terminal 508, and sends it to the decoder (not shown).

In the above-described way, the image data is reproduced until times $t_2, t_3, \ldots, t_n$ so that reproduction of the stream A is ended.

The encoder must encode image data without causing overflow or underflow of the above-described vbv_buffer model. The decoder can decode image data without any failure such as frame skip or frame hold by executing reproduction in accordance with the vbv_buffer model.

Consider a case wherein another stream B is reproduced next to the stream A recorded on the recording medium.

To reproduce without causing overflow or underflow of the vbv_buffer model on the decoder side, the control circuit 507 controls the reproduction circuit 502 and buffer 503 such that after the final reproduced data of the stream A is read out from the buffer 503 at decoding time $t_n$, the data of the stream B is fetched in the buffer 503, as shown in FIG. 5B.

The control circuit 507 notifies the decoding time calculation circuit 506 of the fetch time $t_n$ of the stream B and fetches the stream B in the buffer 503 through the reproduction circuit 502.

The vbv_delay detection circuit 504 detects vbv_delayB(0) and supplies it to the decoding time calculation circuit 506. On the basis of the fetch time $t_n$ and vbv_delayB(0), the decoding time calculation circuit 506 calculates a decoding time $t_m$ given by $$t_m = t_n + vbv\_delayB(0) \quad (3)$$

($t_{n+3} = t_m$ FIG. 5B) and supplies the decoding time $t_m$ to the control circuit 507.

The decoding time of the stream B is calculated by the decoding time calculation circuit 506 by $$t_r = t_n + T_v \times r \ (r=0, 1, 2, \ldots) \quad (4)$$

The control circuit 507 controls the fetch/read in/from the buffer in the same way as for the stream A, as shown in FIG. 5B.

In the above-described method, neither buffer overflow nor underflow occurs because the stream B is fetched in the buffer 503 after the stream A is completely read out from the buffer 503 at the decoding time of the last data of the stream A. However, since decoding cannot be executed at the reproduction transition from the stream A to the stream B, i.e., at times $t_{n+1}$ and $t_{n+2}$, the reproduced image of the stream A cannot smoothly be switched to that of the stream B. That is, the continuity of a reproduced image is disrupted.

To solve this problem, Japanese Patent Laid-Open No. 2002-158968 proposes a technique in which fetch of the stream B in the buffer 503 is started from an end time $t_e$ of fetch of the stream A in the buffer 503, as shown in FIG. 5C, to speed up fetch in the buffer 503 while stopping fetch in the buffer 503 if overflow is going to occur. The decoding time of the stream B is set at $t_s$ in FIG. 5C to shorten the time of discontinuity of a reproduced image (the time while the continuity of decoding times is damaged) as much as possible.

Although this method can solve the problem of interruption of the discontinuity of a reproduced image, there is still room for improvement.

SUMMARY OF THE INVENTION

The present invention has been in consideration of the above-described problems, and has as its object to suppress discontinuity of a moving image as much as possible in continuous reproduction of the moving image.

In order to solve the above-described problem and achieve the object, according to the first aspect of the present invention, there is provided an image reproduction apparatus comprising: a reproducing device which reproduces an image data stream encoded by using inter-frame encoding; a buffer device which temporarily stores the encoded image data stream reproduced by the reproducing device; a buffer size setting device which sets an amount of image data which can be stored in the buffer device; a decoding time calculation device which calculates a decoding time as a timing at which the encoded image data stream is output from the buffer device to a decoder; and a control device which controls the buffer device, the buffer size setting device, and the decoding time calculation device to set the amount of image data which can be stored in the buffer device to at least twice a maximum value of an amount required by an encoded data stream reproducible by the image reproduction apparatus, start storing a second encoded image data stream in the buffer device after storage of a first encoded image data stream in the buffer device is ended before the first image data stream is completely output to the decoder, and calculate a decoding time of the second image data stream on the basis of a time when storage of the first image data stream in the buffer device is ended. According the second aspect of the present invention, there is provided an image reproduction apparatus comprising: a reproducing device which reproduces an image data stream encoded by using inter-frame encoding; a buffer device which temporarily stores the encoded image data stream reproduced by the reproduction device; a buffer size setting device which sets an amount of image data which can be stored in the buffer device; a decoding time calculation device which calculates a decoding time as a timing at which the encoded image data stream is output from the buffer device to a decoder; and a control device which controls the buffer device, the buffer size setting device, and the decoding time calculation device to set a storage size required by a first encoded image data stream as the storage size of the buffer device, start fetching a second encoded image data stream in the buffer device immediately after fetch of the first image data stream in the buffer device is ended, set again a sum of a value of a storage size required by the second image data stream and a value of the storage size required by the preceding first image data stream as the storage size of the buffer device, and calculate a decoding time of the second image data stream on the basis of a time when fetch of the first image data stream in the buffer device is ended. According to the third aspect of the present invention, there is provided a method of controlling an image reproduction apparatus including a reproducing device which reproduces an image data stream encoded by using inter-frame encoding, a buffer device which temporarily stores an encoded image data stream reproduced by the reproducing device, a buffer size setting device which sets an amount of image data which can be stored in the buffer device, and a decoding time calculation device which calculates a decoding time as a timing at which the encoded image data stream is output from the buffer device to a decoder, comprising: a buffer size setting step of causing the buffer size setting device to set the storage size of the buffer device to at least twice a maximum value of a storage size required by an encoded data stream reproducible by the image reproduction apparatus; a data fetch step of starting fetching a second encoded image data stream in the buffer device immediately after fetch of a first encoded image data stream in the buffer device is ended; and a decoding time calculation step of causing the decoding time calculation device to calculate a decoding time of the second image data stream on the basis of a time when fetch of the first image data stream in the buffer device is ended. According to the fourth aspect of the present invention, there is provided a method of controlling an image reproduction apparatus including a reproducing device which reproduces an image data stream encoded by using inter-frame encoding, a buffer device which temporarily stores an encoded image data stream reproduced by the reproduction device, a buffer size setting device which sets an amount of image data which can be stored in the buffer device, and a decoding time calculation device which calculates a decoding time as a timing at which the encoded image data stream is output from the buffer device to a decoder, comprising: a buffer size setting step of causing the buffer size setting device to set a storage size required by a first encoded image data stream as the storage size of the buffer device; a data fetch step of starting fetching a second encoded image data stream in the buffer device immediately after fetch of the first image data stream in the buffer device is ended; a buffer size re-setting step of setting again a sum of a value of a storage size required by the second image data stream and a value of the storage size required by the preceding first image data stream as the storage size of the buffer device; and a decoding time calculation step of causing the decoding time calculation device to calculate a decoding time of the second image data stream on the basis of a time when fetch of the first image data stream in the buffer device is ended. According to the fifth aspect of the present invention, there is provided a program characterized by causing a computer to execute the above control method.

According to the sixth aspect of the present invention, there is provided a computer-readable storage medium characterized by storing the above program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 5A to 5C are timing charts for explaining conventional moving image data buffer models.

DETAILED DESCRIPTION OF THE PREFERRED EMBODIMENTS

Preferred embodiments of the present invention will be described below in detail with reference to the accompanying drawings.

First Embodiment

Figure 1:
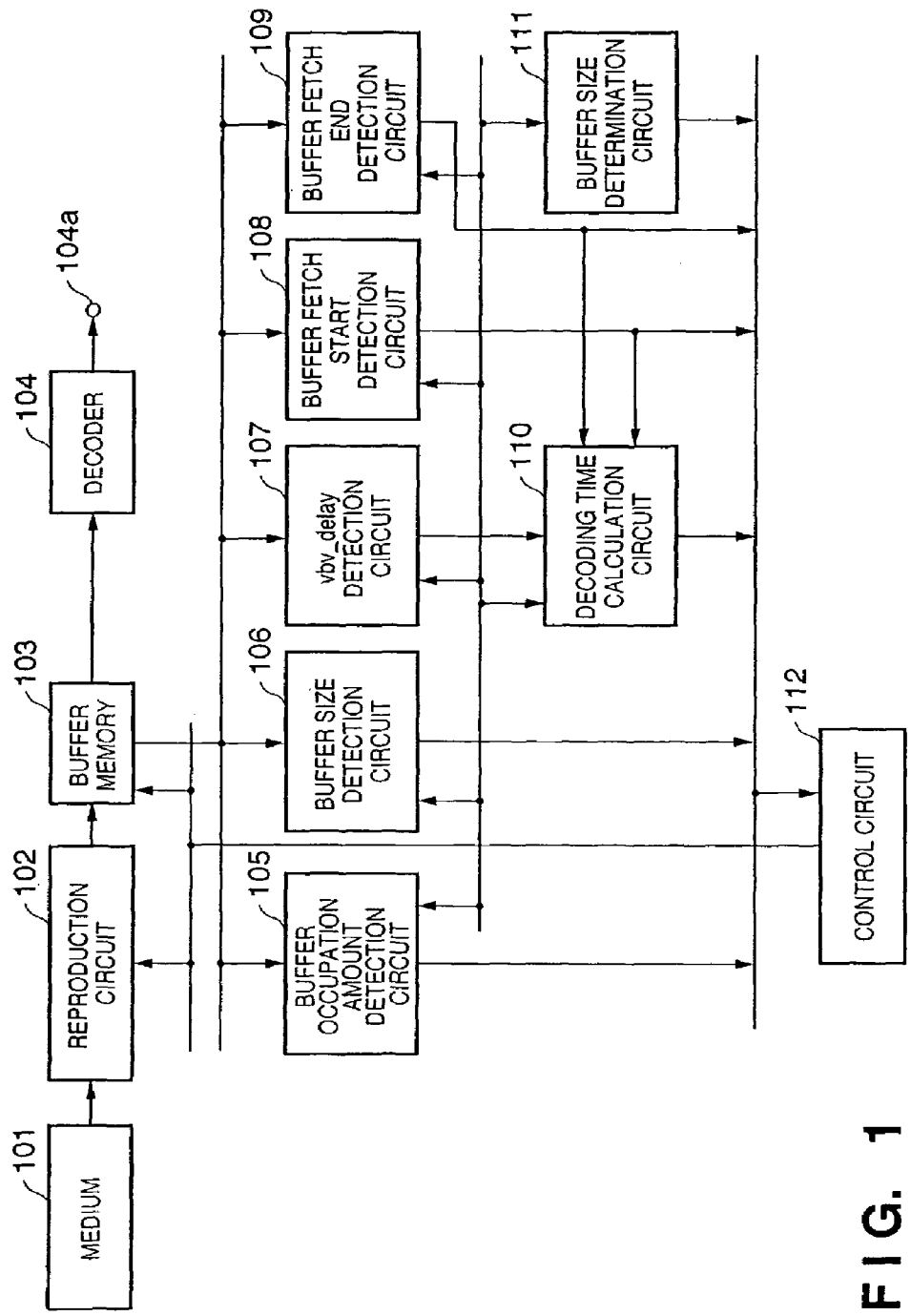
FIG. 1 is a block diagram showing the arrangement of an image reproduction apparatus according to the first embodiment of the present invention.

FIG. 1 is a block diagram showing the arrangement of an image reproduction apparatus according to the first embodiment of the present invention.

Referring to FIG. 1, reference numeral 101 denotes a recording medium; 102, a reproduction circuit; 103, a buffer memory; 104, a decoder; 104a, a decoded data output terminal; 105, a buffer occupation amount detection circuit; 106, a buffer size detection circuit; 107, a vbv_delay detection circuit which detects vbv_delay data added to each picture data from reproduced stream data; 108, a buffer fetch start detection circuit; 109, a buffer fetch end detection circuit; 110, a decoding time calculation circuit; 111, a buffer size determination circuit; and 112, a control circuit.

When the reproduction mode starts, the buffer size determination circuit 111 sends, to the control circuit 112, a maximum value $VF_{max}$ of the buffer size processible by the image reproduction apparatus of this embodiment. The control circuit 112 calculates a value twice the maximum value $VF_{max}$ of the buffer size input from the buffer size determination circuit 111 by $$VS = VF_{max} \times 2 \qquad (5)$$

to set a size (storable data amount) VS of the buffer memory 103.

Figure 4:
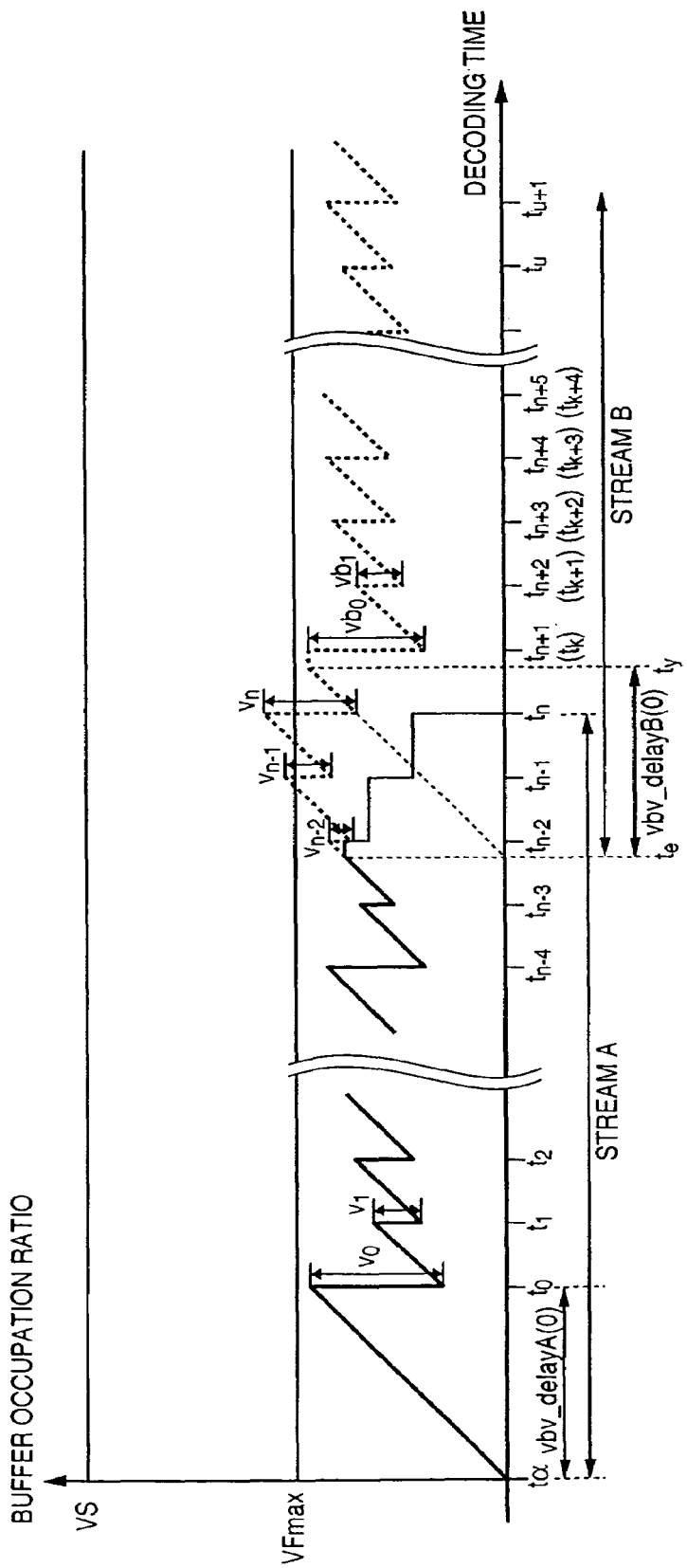
FIG. 4 is a timing chart for explaining a moving image data buffer model in the image reproduction apparatus of the present invention.
Figure 5C:
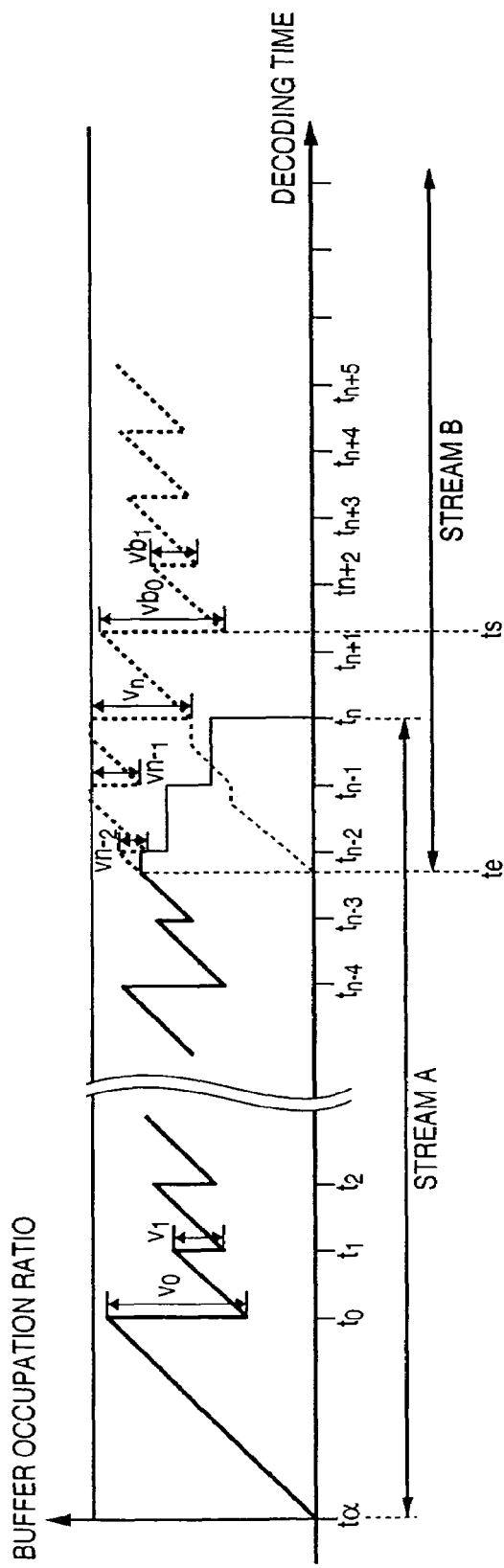
Figure 6:
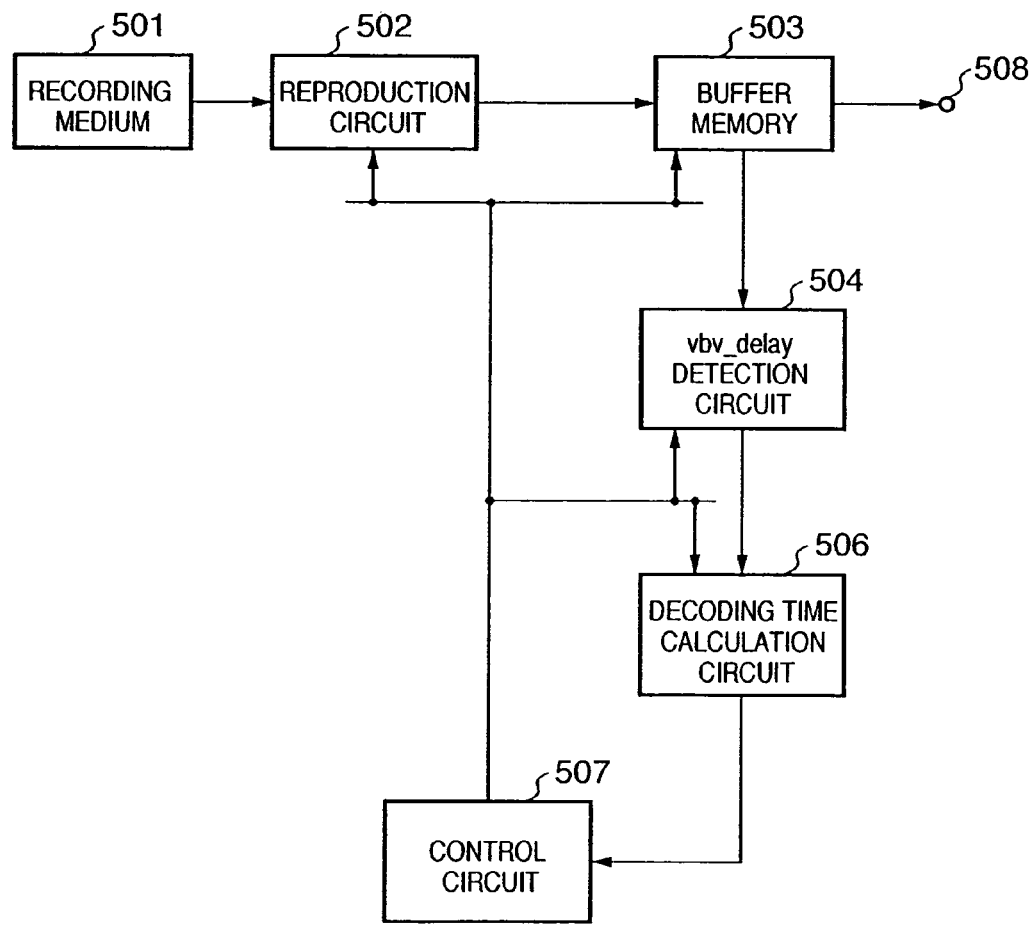
FIG. 6 is a block diagram for explaining a conventional moving image data recording format.

Upon receiving a reproduction instruction, the control circuit 112 controls the reproduction circuit 102 to reproduce a designated stream A from the recording medium 101. The reproduction circuit 102 reads out the data of the stream A from the recording medium 101 and writes the data in the buffer memory 103. FIG. 4 shows simulation of reproduced data stored in the buffer memory 103.

The control circuit 112 reads out the stream A from the recording medium through the reproduction circuit 102 and writes the readout data in the buffer memory 103 until time $t_0$ shown in FIG. 4. At the time $t_0$, data $V_0$ of the stream A stored in the buffer memory 103 is read out, and supplied to a decoder 104 Output data from the decoder 104 are output to the output terminal 104a.

The time $t_0$ is calculated by the decoding time calculation circuit 110 in the following way.

The vbv_delay detection circuit 107 in FIG. 1 detects vbv_delayA(0) of the first frame of the stream A and supplies vbv_delayA(0) to the decoding time calculation circuit 110. The buffer fetch start detection circuit 108 detects start time $t_a$ of fetch of the stream A in the buffer memory 103 and supplies the fetch start time $t_a$ to the decoding time calculation circuit 110. On the basis of the time $t_a$ and vbv_delayA(0), the decoding time calculation circuit 110 calculates the time $t_0$ given by $$t_0 = t_a + vbv\_delayA(0) \qquad (1)$$

and supplies the decoding start time $t_0$ of the first frame other control circuit 112. At the time $t_0$, the control circuit 112 reads out the data $V_0$ of the first frame of the stream A from the buffer memory 103, supplies the data $V_0$ to the decoder 104.

Decoding time $t_q$ from the time $t_0$ shown in FIG. 4 is calculated by the decoding time calculation circuit 506 by $$t_q = t_0 + T_v \times q \, (q=0, 1, 2, \ldots) \qquad (2)$$

and supplied to the control circuit 507, where $T_v$ is the reciprocal of the frame frequency (e.g., 29.97 Hz) of the image data.

The control circuit 112 controls the reproduction circuit 102 to continuously reproduce the stream A from the recording medium 101 and write it in the buffer memory 103 even after the time $t_0$. On the basis of the decoding time supplied from the decoding time calculation circuit 110, reproduced data $V_1, V_2, \ldots$ are read out from the buffer memory 103 at times $t_1, t_2, \ldots$, and supplied to the decoder 104.

As shown in FIG. 4, the read of the stream A from the recording medium 101 is ended at time $t_e$. In this embodiment, at this point of time, the control circuit 112 controls the reproduction circuit 102 to read out next stream B from the recording medium 101 and write it in the buffer memory 103 (a solid line after the time $t_e$ in FIG. 4).

The buffer size detection circuit 106 detects vbv_buffer_size (=v_size(B)) data in the sequence header at the start of the stream B and checks whether the sum of the vbv_buffer_size (=v_size(B)) data and vbv_buffer_size (=V_size(A)) data of the stream A exceeds the set size VS of the buffer memory 103.

The vbv_buffer_size data is described in the sequence header of an elementary stream in an MPEG stream. A sequence header is header information inserted in the sequence layer of an elementary stream in MPEG data. The vbv_buffer_size data is added to, e.g., each data of one GOP and indicates the maximum occupation data amount of the buffer memory in decoding the data of the sequence layer. Hence, at the time of decoding, data stored in the buffer memory never exceeds vbv_buffer_size.

The buffer occupation amount detection circuit 105 detects the occupation amount of reproduced data in the buffer memory 103 and notifies the control circuit 112 of the occupation amount. The control circuit 112 monitors whether the buffer occupation amount supplied from the buffer occupation amount detection circuit 105 exceeds the buffer size VS set for the buffer memory 103. If the occupation amount is going to exceed the buffer size VS, reproduction from the recording medium is stopped to interrupt data fetch in the buffer memory 103.

It is checked from this point of time whether the sum of v_size(B) and the data amount of the stream A stored in the buffer memory 103 exceeds the set size VS. When the sum becomes smaller than the set size VS, the read of the data of the stream B from the recording medium is started.

As shown in FIG. 4, the control circuit 112 reads out reproduced data $V_{n-2}$ and $V_{n-1}$ of the stream A at times $t_{n-2}$ and $t_{n-1}$, respectively. Finally, reproduced data $V_n$ of the stream A is read out from the buffer memory 103 at time $t_n$, and reproduction of the stream A to the decoder 104 is ended.

The vbv_delay detection circuit 107 detects the vbv_delay value (=vbv_delayB(0)) on the basis of vbv_delay data of the first frame of the stream B and supplies the vbv_delay value to the decoding time calculation circuit 110. The buffer fetch end detection circuit 109 detects the end time $t_e$ (time $t_e$ in FIG. 4) of the read of the stream A from the recording medium 101 and supplies the time $t_e$ to the decoding time calculation circuit 110.

The decoding time calculation circuit 110 calculates $$t_y = t_e + vbv\_delayB(0) \qquad (6)$$

and supplies the time $t_y$ to the control circuit 112.

If the time $t_y$ satisfies $$(t_y - t_0) \bmod (T_v) \neq 0 \qquad (7)$$

(A mod B indicates the remainder obtained by dividing A by B), the control circuit 112 stops reading the stream B from the recording medium 101 to interrupt the write in the buffer memory 103 at the time $t_y$ (the time from the time $t_y$ to time $t_{n+1}$ in FIG. 4). At the time $t_{n+1}$, the read of the data of the stream B from the recording medium is started again. If $$t_y \leq t_{n+1} \quad (8)$$

the decoding time calculation circuit 110 calculates a decoding start time $t_k$ of the stream B by $$t_k = t_{n+1} \quad (9)$$

The time $t_{n+1}$ and the read time $t_n$ of the last data $V_n$ of the stream A from the buffer memory 103 have a relationship given by $$t_{n+1} = t_n + T_v \quad (10)$$

Decoding time $t_n$ after the time $t_k$ of the stream B (time $t_{n+1}(=t_n+T_v)$) is given by $$t_u = t_k + T_v \times u (u = 0, 1, 2, \ldots) \quad (11)$$

When $$t_y > t_{n+1} \quad (12)$$

and expression (7) holds, we have $$t_k = t_0 + [t_y - t_0 - ((t_y - t_0) \bmod (T_v))] + T_v \quad (12)$$

When $$(t_y - t_0) \bmod (T_v) = 0 \quad (13)$$

we have $$t_k = t_0 + [t_y - t_0] = t_y \quad (14)$$

Hence, the decoding time $t_u$ of the stream B after the time $t_k$ is given by $$t_u = t_k + T_v \times u (u = 0, 1, 2, \ldots) \quad (11)$$

The decoding time calculation circuit 110 calculates the decoding time $t_u$ of the stream B in the above-described way and supplies the time $t_u$ to the control circuit 112. The control circuit 112 reads out the reproduced data of the stream B from the buffer memory 103 in accordance with the decoding time from the decoding time calculation circuit 110 and supplies the reproduced data to the decoder 104. In other words, the control circuit 112 controls the buffer memory 103 to read out reproduced data from the buffer memory 103 in accordance with the decoding time (times $t_{n+1}(t_k)$, $t_{n+1}(t_k+T_v \times u)$, ..., $t_u$, ... in FIG. 4), outputs the reproduced data to the decoder 104.

As described above, in this embodiment, a size at least twice the buffer memory occupation data amount vbv_buffer_size of MPEG data processible by the reproduction apparatus is set as the size of the buffer memory in the reproduction mode. When the stream B is to be reproduced from the recording medium next to the stream A, the time $t_e$ at which the last data of the reproduced data of the preceding stream A is read out from the recording medium is detected. From the read end time $t_e$, fetch of the reproduced data of the next stream B in the buffer memory is started.

That is, the apparatus is designed such that even when data stored in the buffer memory 103 exceeds vbv_buffer_size, the data of the stream B can be stored in the buffer memory 103. In addition, the decoding start time of the first frame of the stream B is calculated from the read end time $t_e$ of the data of the final frame of the stream A. Discontinuity which occurs when the reproduced image of the stream A is switched to that of the stream B can be minimized. Hence, discontinuity of a moving image can also be minimized (in this embodiment, when $t_y \leq t_{n+1}$, the continuity of decoding times is maintained, as shown in FIG. 4, and a moving image is smoothly reproduced).

Second Embodiment

Figure 2:
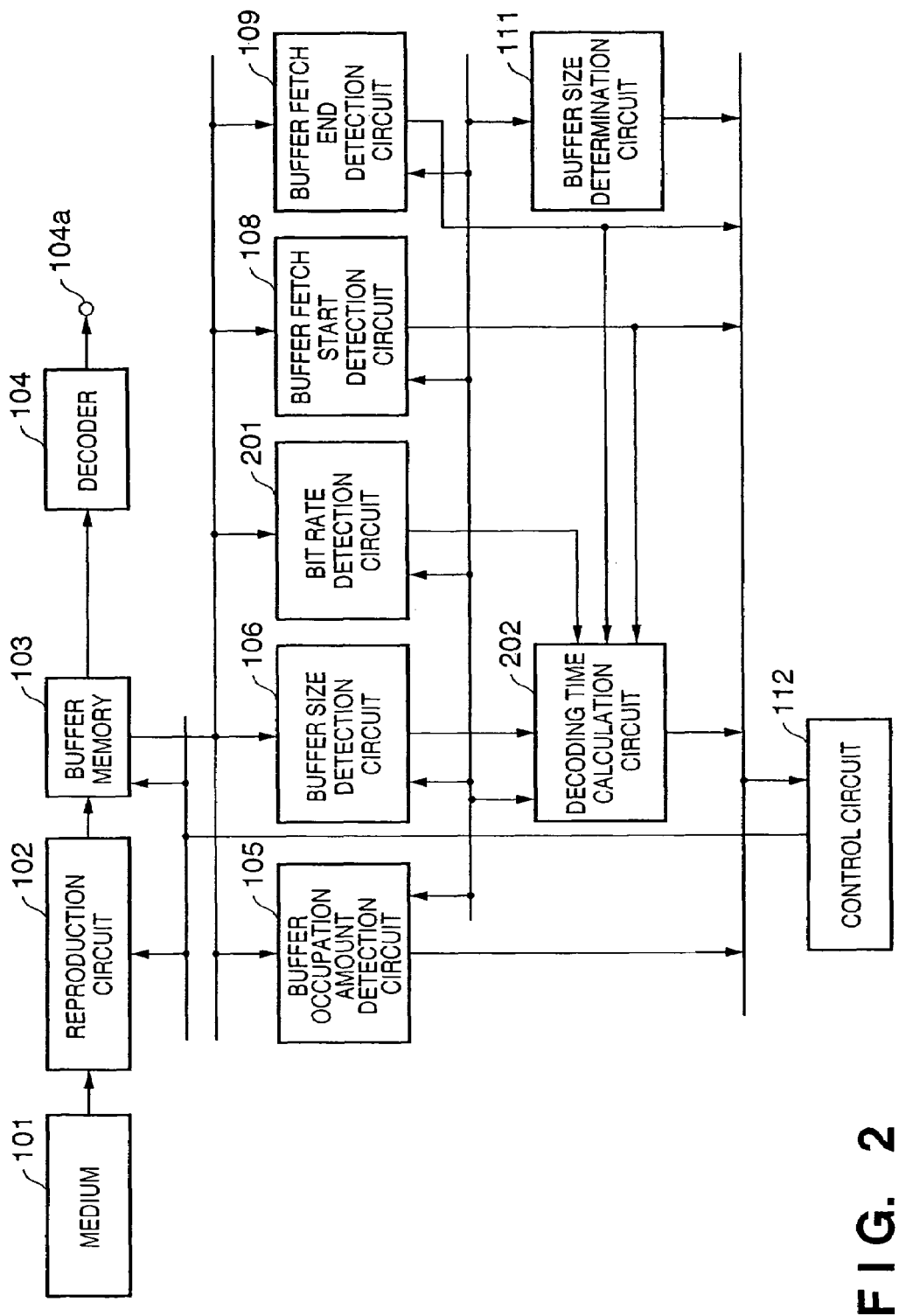
FIG. 2 is a block diagram showing the arrangement of an image reproduction apparatus according to the second embodiment of the present invention.

FIG. 2 is a block diagram showing the arrangement of an image reproduction apparatus according to the second embodiment of the present invention.

Referring to FIG. 2, reference numeral 101 denotes a recording medium; 102, a reproduction circuit; 103, a buffer memory; 104, a decoder; 104a, a decoded data output terminal; 105, a buffer occupation amount detection circuit; 106, a buffer size detection circuit; 108, a buffer fetch start detection circuit; 109, a buffer fetch end detection circuit; 111, a buffer size determination circuit; 112, a control circuit; 201, a bit rate detection circuit; and 202, a decoding time calculation circuit.

The same reference numerals as in FIG. 1 of the first embodiment denote parts having the same functions in FIG. 2. Only portions different from the first embodiment will be described below.

When reproduction from the recording medium 101 is started to fetch a stream A in the buffer memory 103, the buffer size detection circuit 106 detects vbv_buffer_size (=v_size(A)) described in the sequence header of an elementary stream in the stream A and supplies the size to the decoding time calculation circuit 202. The bit rate detection circuit 201 detects a bit rate Ra on the basis of bit rate information of the stream A described in the sequence header in the stream A and supplies the bit rate Ra to the decoding time calculation circuit 202. The buffer fetch start detection circuit 108 detects a fetch start time $t_a$ of the stream A in the buffer memory 103 and supplies the time to the decoding time calculation circuit 202.

The decoding time calculation circuit 202 calculates a decoding start time $t_0$ of the first frame of the stream A by $$t_0 = t_a + v\_size(A)/Ra \quad (14)$$

and supplies the decoding time to $t_0$ the control circuit 112.

The value v_size(A)/Ra indicates a time required from the start of storage of data at the bit rate Ra in the buffer memory 103 until storage of data in V_size(A).

Decoding time $t_q$ from the time $t_0$ is calculated by the decoding time calculation circuit 202 by $$t_q = t_0 + T_v \times q (q = 0, 1, 2, \ldots) \quad (2)$$

and supplied to the control circuit 112.

The buffer fetch end detection circuit 109 detects a data fetch end time $t_e$ of the stream A in the buffer memory 103 and supplies the time $t_e$ to the decoding time calculation circuit 202 and control circuit 112.

The buffer size detection circuit 106 detects vbv_buffer_size (=v_size(B)) of a stream B and supplies it to the decoding time calculation circuit 202. The bit rate detection circuit 201 detects a bit rate Rb and supplies it to the decoding time calculation circuit 202.

The decoding time calculation circuit 202 calculates $$t_y = t_e + v\_size(B)/Rb \quad (15)$$

and supplies the time $t_y$ to the control circuit 112.

Calculation of a decoding start time $t_k$ and decoding time $t_u$ of the stream B and the method of fetching/reading the stream B in/from the buffer memory are the same as in the first embodiment.

As described above, a size at least twice the maximum buffer size vbv_buffer_size processable by the reproduction apparatus is prepared in the buffer memory, as in the first embodiment. The time $t_e$ at which the last data of the reproduced data of the preceding stream A is read out from the recording medium is detected. From the read end time $t_e$, fetch of the reproduced data of the next stream B in the buffer memory is started. That is, even when the fetch amount in the buffer memory exceeds vbv_buffer_size, the data of the stream B can be fetched in the buffer memory. The reproduction time of the stream B is recalculated on the basis of the read end time $t_e$, the bit rate of the stream B, and vbv_buffer_size. Hence, discontinuity of decoding times can be minimized at the reproduction transition from the stream A to the stream B. Discontinuity of a moving image can also be minimized (in this embodiment, when $t_y \leq t_{n+1}$, the continuity of decoding times is maintained, as shown in FIG. 4, and a moving image is smoothly reproduced).

Third Embodiment

Figure 3:
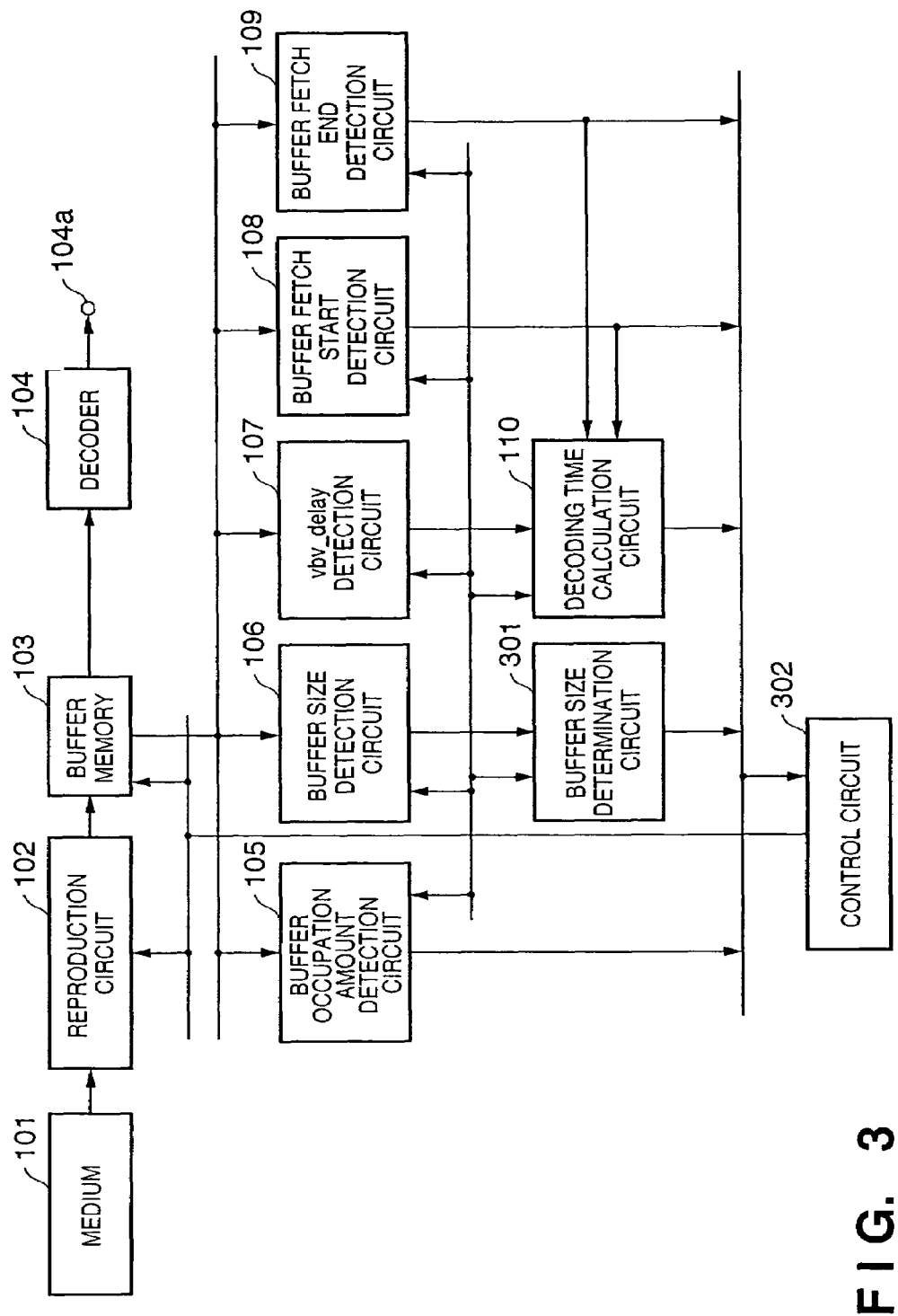
FIG. 3 is a block diagram showing the arrangement of an image reproduction apparatus according to the third embodiment of the present invention.

FIG. 3 is a block diagram showing the arrangement of an image reproduction apparatus according to the third embodiment of the present invention.

Referring to FIG. 3, reference numeral 101 denotes a recording medium; 102, a reproduction circuit; 103, a buffer memory; 104, a decoder; 104a, a decoded data output terminal; 105, a buffer occupation amount detection circuit; 106, a buffer size detection circuit; 107, a vbv_delay detection circuit; 108, a buffer fetch start detection circuit; 109, a buffer fetch end detection circuit; 110, a decoding time calculation circuit; 301, a buffer size determination circuit; and 302, a control circuit.

The same reference numerals as in FIG. 1 of the first embodiment denote parts having the same functions in FIG. 3. Only portions different from the first embodiment will be described below.

When reproduction of a stream A recorded on the recording medium 101 starts, the buffer size detection circuit 106 detects vbv_buffer_size (=v_size(A)) of the stream A and supplies it to the buffer size determination circuit 301. The buffer size determination circuit 301 calculates the value vbv_buffer_size=v_size(A) of the stream A by $$Vsize = v\_size(A) \tag{16}$$

and supplies the value Vsize to the control circuit 302.

The control circuit 302 sets the value Vsize (=v_size(A)) as the size of the buffer memory 103.

Derivation of a reproduction start time $t_0$ and decoding time $t_q$ of the stream A and buffer fetch/read control are the same as in the first or second embodiment.

When fetch of a stream B in the buffer memory 103 starts at a fetch end time $t_e$ of the stream A in the buffer memory 103, the buffer size detection circuit 106 detects vbv_buffer_size (=v_size(B)) of the stream B and supplies it to the buffer size determination circuit 301.

The buffer size determination circuit 301 calculates the sum of the value vbv_buffer_size=v_size(A) of the stream A and the value vbv_buffer_size=v_size(B) of the stream B by $$Vsize = v\_size(A) + v\_size(B) \tag{17}$$

and supplies the value Vsize to the control circuit 302.

The control circuit 302 sets the value Vsize (=v_size(A)+v_size(B)) again as the size of the buffer memory 103.

Read control of the stream A, buffer fetch/read control of the stream B, and calculation of a decoding start time $t_k$ and decoding time $t_u$ are the same as in the first or second embodiment.

At a read end time $t_n$ of last data $V_n$ of the stream A from the buffer memory 103, the control circuit 302 notifies the buffer size determination circuit 301 that sweep of the stream A from the buffer memory 103 is ended.

Upon recognizing that sweep of the stream A from the buffer memory 103 is ended, on the basis of vbv_buffer_size=v_size(B) of the stream B, the buffer size determination circuit 301 sets Vsize as $$Vsize = v\_size(B) \tag{18}$$

and supplies the value to the control circuit 302.

The control circuit 302 sets Vsize=v_size(B) supplied from the buffer size determination circuit 301 again as the size of the buffer memory 103.

Buffer fetch/read control of the stream B from the time $t_n$ and calculation of the decoding start time $t_k$ and decoding time $t_u$ are the same as in the first or second embodiment.

As described above, in seamless reproduction, vbv_buffer_size=v_size(A) of the preceding stream A is detected. While only the reproduced data of the stream A is present in the buffer memory, the buffer size is set to vbv_buffer_size=v_size(A) of the stream A. The time $t_e$ at which the last data of the stream A is read out from the recording medium is detected. From the fetch end time $t_e$, fetch of the next stream B in the buffer memory is started. Then, vbv_buffer_size=v_size(B) of the stream B is detected. While both the stream A and the stream B are present in the buffer memory, the buffer size is set again to v_size(A)+v_size(B). With this arrangement, even when the fetch amount of the stream B in the buffer memory exceeds vbv_buffer_size, the data can be fetched in the buffer memory. The reproduction time of the stream B is recalculated on the basis of the read end time $t_e$ of the stream A. Hence, discontinuity of decoding times can be minimized at the reproduction transition from the stream A to the stream B. Discontinuity of a moving image can also be minimized (in this embodiment, when $t_y \leq t_{n+1}$, the continuity of decoding times is maintained, as shown in FIG. 4, and a moving image is smoothly reproduced).

As described above, according to the above-described embodiments, in continuous reproduction of a moving image, discontinuity of the moving image can be suppressed as much as possible.

Other Embodiment

The object of the embodiments can also be achieved by supplying a storage medium (or recording medium) which records software program codes for implementing the functions of the above-described embodiments to a system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the storage medium, program codes corresponding to the above-described procedures are stored in the storage medium.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-244126 filed on Aug. 24, 2004, which is hereby incorporated by reference herein.

What is claimed is:

1. An image reproduction apparatus, comprising:
a reproducing device which continuously reproduces a plurality of image data streams each encoded by using inter-frame encoding;
a buffer memory which temporarily stores the encoded image data stream reproduced by said reproducing device;
a decoding time calculation device which calculates a decoding time as a timing at which the encoded image data stream is output from the buffer memory to a decoder;
a buffer size setting device which sets an amount of the buffer memory for storing the encoded image data stream on the basis of an amount required by the encoded image data stream reproduced by the reproducing device, the buffer size setting device setting the amount of the buffer memory to at least twice a maximum value of the amount required by the encoded image data stream reproduced by the reproducing device;
a control device which controls the buffer memory, so as to succeedingly start storing a second encoded image data stream in the buffer memory after storage of a first encoded image data stream in the buffer memory is ended, and to continuously output the first encoded image data stream and the second encoded image data stream stored in the buffer memory to the decoder according to the decoding time calculated by the decoding time calculation device, the first encoded image data stream and the second encoded image data stream being included in the plurality of image data streams reproduced by said reproducing device,
the decoding time calculation device calculating a first decoding time of the second encoded image data stream on the basis of a time when storage of the first encoded image data stream in said buffer memory is ended and a first vbv_Delay value of the second encoded image data stream.

2. The apparatus according to claim 1, wherein the encoded image data stream is an MPEG data stream.

3. The apparatus according to claim 1, wherein said decoding time calculation device calculates the decoding time on the basis of storage amount information contained in the encoded image data stream and a bit rate of the encoded image data stream.

4. The apparatus according to claim 3, wherein the storage amount information contained in the encoded image data stream is vbv_buffer_size.

5. An image reproduction apparatus, comprising:
a reproducing device which continuously reproduces a plurality of image data streams each encoded by using inter-frame encoding;
a buffer memory which temporarily stores the encoded image data stream reproduced by the reproduction device;
a decoding time calculation device which calculates a decoding time as a timing at which the encoded image data stream is output from the buffer memory to a decoder;
a buffer size setting device which sets an amount of the buffer memory for storing the encoded image data stream on the basis of an amount required by the encoded image data stream reproduced by the reproducing device;
a control device which controls said buffer memory so as to succeedingly start storing a second encoded image data stream in the buffer memory after storage of a first encoded image data stream in the buffer memory is ended and, and to continuously output the first encoded image data stream and the second encoded image data stream stored in the buffer memory to the decoder according to the decoding time calculated by the decoding time calculation device, the first encoded image data stream and the second encoded image data stream being included in the plurality of image data streams reproduced by said reproducing device,
wherein said control device controls such that the buffer size setting device sets the amount of the buffer memory based on an amount required by the first encoded image data stream and the first encoded image data stream is stored in the buffer memory, and resets the amount of the buffer memory based on a sum of a value of the amount required by the first encoded image stream and a value of an amount required by the second encoded image data stream after storage of the first encoded image data stream in said buffer memory is ended, and the first encoded image data stream and the second encoded image data stream are succeedingly stored in the buffer memory,
and the decoding time calculation device calculates a first decoding time of the second encoded image data stream on the basis of a time when storage of the first encoded image data stream in said buffer memory device is ended and a first vbv_Delay value of the second encoded image data stream.

6. The apparatus according to claim 5, wherein the encoded image data stream is an MPEG data stream.

7. The apparatus according to claim 5, wherein said decoding time calculation device calculates the decoding time on the basis of storage amount information contained in the encoded image data stream and a bit rate of the encoded image data stream.

8. The apparatus according to claim 7, wherein the storage amount information contained in the encoded image data stream is vbv_buffer_size.

9. A method of controlling an image reproduction apparatus including a reproducing device which continuously reproduces a plurality of image data streams each encoded by using inter-frame encoding,
a buffer memory which temporarily stores encoded image data stream reproduced by said reproducing device, a buffer size setting device which sets an amount of the buffer memory for storing the encoded image data stream, and a decoding time calculation device which calculates a decoding time at which the encoded image data stream is output from the buffer memory to a decoder, said method comprising:
a buffer size setting step of causing the buffer size setting device to set the amount of the buffer memory to at least twice an amount required by an encoded image data stream reproducible by the reproducing device;
a control step of controlling the buffer memory so as to succeedingly start storing a second encoded image data stream in the buffer memory after storage of a first encoded image data stream in the buffer memory is ended, and to continuously output the first encoded image data stream and the second encoded image data stream stored in the buffer memory to the decoder according to the decoding time calculated by decoding time calculation device, the first encoded image data stream and the second encoded image data stream being included in the plurality of image data streams reproduced by the reproducing device; and
a decoding time calculation step of causing the decoding time calculation device to calculate a first decoding time of the second encoded image data stream on the basis of a time when storage of the first encoded image data stream in the buffer memory is ended and a first vbv_Delay value of the second encoded image data stream.

10. The method according to claim 9, wherein the encoded image data stream is an MPEG data stream.

11. The method according to claim 9, wherein in the decoding time calculation step, the decoding time is calculated on the basis of storage amount information contained in the encoded image data stream and a bit rate of the encoded image data stream.

12. The method according to claim 11, wherein the storage amount information contained in the encoded image data stream is vbv_buffer_size.

13. A method of controlling an image reproduction apparatus including a reproducing device which continuously reproduces a plurality of image data streams each encoded by using inter-frame encoding,
a buffer memory which temporarily stores an encoded image data stream reproduced by said reproduction device, a buffer size setting device which sets an amount of the buffer memory for storing the encoded image data stream, and a decoding time calculation device which calculates a decoding time at which the encoded image data stream is output from the buffer memory to a decoder, said method comprising:
a buffer size setting step of causing the buffer size setting device to set an amount of the buffer memory for storing the encoded image data stream on the basis of an amount required by the encoded image data stream reproduced by the reproducing device;
a control step of controlling the buffer memory so as to succeedingly start storing a second encoded image data stream in the buffer memory after storage of a first encoded image data stream in the buffer memory is ended, and to continuously output the first encoded image data stream and the second encoded image data stream stored in the buffer memory to the decoder according to the decoding time calculated by the decoding time calculation device, the first encoded image data stream and the second encoded image data stream being included in the plurality of image data streams reproduced by the reproducing device;
a buffer size re-setting step of resetting the amount of the buffer memory based on a sum of a value of the amount required by the first encoded image data stream and a value of an amount required by the second encoded image data stream after storage of the first encoded image data stream in the buffer memory is ended and the first encoded image data stream and the second encoded image data stream are succeedingly stored in the buffer memory; and
a decoding time calculation step of causing the decoding time calculation device to calculate a first decoding time of the second encoded image data stream on the basis of a time when storage of the first encoded image data stream in the buffer memory is ended and a first vbv_Delay value of the second encoded image data stream.

14. The method according to claim 13, wherein the encoded image data stream is an MPEG data stream.

15. The method according to claim 13, wherein in the decoding time calculation step, the decoding time is calculated on the basis of storage amount information contained in the encoded image data stream and a bit rate of the encoded image data stream.

16. The method according to claim 15, wherein the storage amount information contained in the encoded image data stream is vbv_buffer_size.

* * * * *